United States Patent [19]

Lasker et al.

[11] Patent Number: 5,586,291
[45] Date of Patent: Dec. 17, 1996

[54] DISK CONTROLLER WITH VOLATILE AND NON-VOLATILE CACHE MEMORIES

[75] Inventors: Jeffrey M. Lasker, Marlboro; James M. McGillis, Franklin, both of Mass.

[73] Assignee: EMC Corporation, Hopkinton, Mass.

[21] Appl. No.: 363,298

[22] Filed: Dec. 23, 1994

[51] Int. Cl.⁶ .................................................. G06F 13/00
[52] U.S. Cl. ............................... 395/440; 395/492
[58] Field of Search ............................ 395/440, 492, 395/842, 873, 876

[56] References Cited

U.S. PATENT DOCUMENTS

| | | | |
|---|---|---|---|
| 4,392,200 | 7/1983 | Arulpragasam et al. | 395/467 |
| 4,439,829 | 3/1984 | Tsiang | 395/445 |
| 4,755,930 | 7/1988 | Wilson, Jr. et al. | 395/449 |
| 4,794,524 | 12/1988 | Carberry et al. | 395/375 |
| 4,831,581 | 5/1989 | Rubinfeld | 395/250 |
| 4,885,680 | 12/1989 | Anthony et al. | 364/471 |
| 4,888,689 | 12/1989 | Taylor et al. | 364/467 |
| 4,899,275 | 2/1990 | Sachs et al. | 364/403 |
| 4,972,338 | 11/1990 | Crawford et al. | 364/416 |
| 4,985,829 | 1/1991 | Thatte et al. | 364/417 |
| 5,067,078 | 11/1991 | Talgam et al. | 395/403 |
| 5,073,851 | 12/1991 | Masterson et al. | 395/467 |
| 5,091,846 | 2/1992 | Sachs et al. | 395/250 |
| 5,107,457 | 4/1992 | Hayes et al. | 395/800 |
| 5,146,571 | 9/1992 | Logan | 395/182.06 |
| 5,150,472 | 9/1992 | Blank et al. | 395/464 |
| 5,151,989 | 9/1992 | Johnson et al. | 395/600 |
| 5,163,142 | 11/1992 | Mageau | 395/469 |
| 5,170,476 | 12/1992 | Laakso et al. | 395/467 |
| 5,193,166 | 3/1993 | Menasce | 395/447 |
| 5,257,352 | 10/1993 | Yamamoto et al. | 395/463 |
| 5,274,787 | 12/1993 | Hirano et al. | 395/470 |
| 5,276,833 | 1/1994 | Auvinen et al. | 395/432 |
| 5,287,473 | 2/1994 | Mohan et al. | 395/460 |
| 5,303,362 | 4/1994 | Butts, Jr. et al. | 395/448 |
| 5,347,642 | 9/1994 | Barratt | 395/440 |
| 5,349,651 | 9/1984 | Hetherington et al. | 395/417 |

*Primary Examiner*—David L. Robertson
*Attorney, Agent, or Firm*—Weingarten, Schurgin, Gagnebin & Hayes LLP

[57] ABSTRACT

A disk storage subsystem includes both volatile and non-volatile portions of memory. In response to a write command from a host computer, the controller allocates a predetermined number of memory blocks in the non-volatile cache memory and allocates a corresponding number of blocks in the volatile memory. Host supplied write data is then stored in the allocated non-volatile memory blocks. The data may also be mirrored in additional non-volatile memory. Immediately thereafter the subsystem sends an acknowledge signal to the host. The subsystem then performs a DMA operation to copy the write-data from the non-volatile memory blocks to the volatile memory blocks. The write-data is then stored on a disk drive at which point the non-volatile memory may be de-allocated. Subsequent reads of the given data may be read from the volatile memory, reducing disk access time. In the event of a power failure, data stored in the non-volatile memory but not yet written to disk is preserved. In the event of a disk controller failure, the non-volatile memory modules may be transferred to a functioning disk controller for recovery.

23 Claims, 6 Drawing Sheets

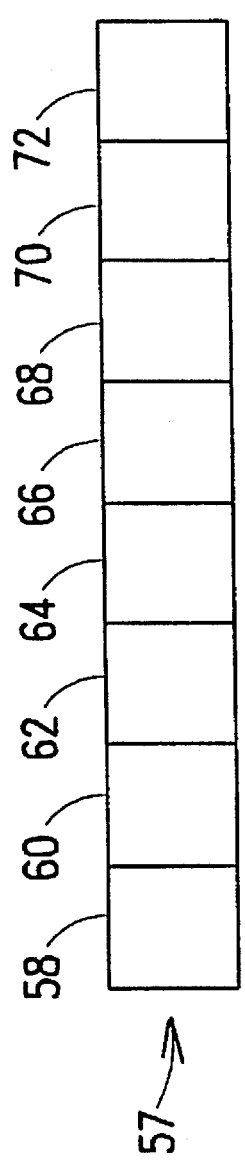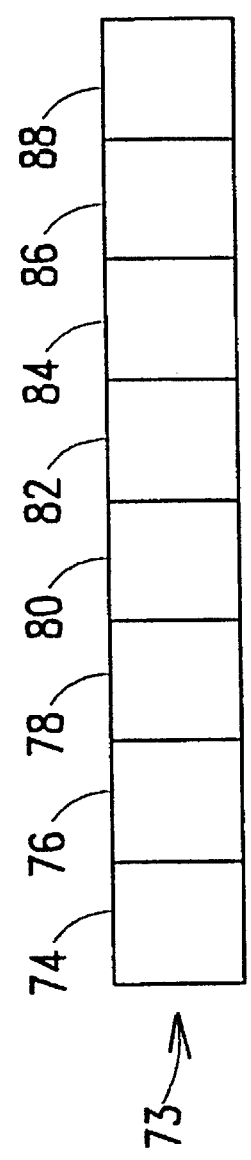

DISK CONTROLLER WITH VOLATILE AND NON-VOLATILE CACHE MEMORIES

FIELD OF THE INVENTION

This invention relates to disk storage subsystems and more particularly to cache memory management in disk storage subsystems.

BACKGROUND OF THE INVENTION

Due to the large amount of information processed by present day computer systems, there is a trend to couple a disk storage subsystem to a host computer to thus increase the data storage capability and efficiency of the host computer.

Disk storage subsystems typically include a disk controller and one or more disk drives. The disk controller includes a controller microprocessor coupled to a host interface circuit and a disk interface circuit. The controller microprocessor generally coordinates and controls the transfer of data from the host computer to the disk storage subsystem and vice-versa.

As is known, the increasing performance characteristics of central processor units (CPUs) and memories in host computers has not generally been matched by similar performance increases in disk storage subsystems. In particular, mechanical latency i.e. the time required to access data or instructions stored in the disk storage subsystem of a computer, has increasingly become the factor which prevents the full realization of the speed of contemporary computer systems. This result is occurring because the speed of CPUs has outstripped the speed with which disk storage subsystems can provide data to a host.

The longer it takes to obtain data from the disk storage subsystem, the slower a host CPU runs because CPUs usually remain idle while waiting for data. Thus, one negative effect of disk latency is its effect on CPU speed.

This negative effect has increased as CPU speed has outstripped disk subsystem speed. Thus, despite the advances made in high density, high speed disk storage subsystems, disk storage subsystems typically remain the speed limiting link in a computer system. One way to reduce average latency in a disk storage subsystem is to add a cache memory to the disk storage subsystem.

A cache memory generally includes a relatively small memory device physically situated proximate the disk controller of the disk storage subsystem. The caching method is software controlled. Due to the physical proximity of the cache memory to the disk controller and the nature of the cache memory control, latency of the cache memory is several times less than the latency of the disk drives. Since cache memory latency is much less than disk drive latency, overall system speed is improved in disk storage subsystems that include a cache memory.

Cache memories capitalize on the characteristic that once a host computer reads data from or writes data to the disk drives, it is very likely that this data will be reused by the host computer in the near future. For simplicity of description, data, instructions and any other forms of information commonly stored in computer memories are collectively hereinafter referred to as data. Thus, frequently used data or instructions are replicated in cache memories.

When the host computer initiates a data write operation for example, the data is first stored in the cache memory and then subsequently stored on the disk drives. If the host computer later requests the same data, the data may thus be retrieved from the cache memory rather than from a disk drive.

Retrieving data from the cache memory avoids the necessity of accessing one or more disk drives of the disk storage subsystem which are relatively slow compared to the cache memory. Therefore data retrieval is accomplished more rapidly which in turn leads to an overall increase in system performance.

While disk storage subsystems that include a cache memory have a number of advantages, one disadvantage is the expense of cache memories. This disadvantage is amplified because a cache memory does not add memory capacity to disk storage subsystem. Rather, cache memories are add-ons to disk memory, because, as noted above cache memories replicate data stored in the disk drives of the disk storage subsystem.

Another problem which arises with cache memories is the need to maintain coherency between data stored in the cache memory and data stored on the disk drives of the disk storage subsystem. More specifically, since data stored at either location can be updated, a disk storage subsystem that includes a cache memory must also include a technique for maintaining coherency between the same data stored in the cache memory and the disk drives. If coherency is not maintained, data at one memory location may become stale and the same data at another memory location may be updated. The subsequent use of stale or corrupt data in the computer system can lead to errors.

Several different types of cache management techniques have been developed to control the process which occurs when data stored in a cache memory are updated. Generally, in response to a host processor initiated write operation, the write-data is written to the cache memory and then propagated directly to the disk drives. Cache memories throughout the disk storage subsystem are searched and any copies of written data are either invalidated or updated.

Another problem with cache memories is the volatile nature of the cache memories. That is, data stored in volatile cache memories is lost in the event of a power or device failure in the disk controller.

One solution to this problem is to provide the entire cache memory as a non-volatile cache memory. For example, the cache memory may include a battery back-up circuit which provides power to the cache memory in the event of a power failure. One problem with this approach, however, is the large expense involved in providing a cache memory having a battery circuit and a power sense circuit to detect when a power failure is occurring and that batteries should be engaged for back up operation. Moreover, such battery and power sense circuits lead to a relatively complex cache memory circuit design. Also the additional circuitry may reduce the reliability of the cache memory.

Furthermore, if the entire cache is provided as a non-volatile cache it is relatively difficult and expensive to duplicate the contents of the cache memory since it would be necessary to provide a second non-volatile cache memory having a memory size equal to or greater than first non-volatile cache memory so that the contents of the first non-volatile cache memory could be duplicated and stored to protect the contents before transfer to a drive disk.

It would be desirable, therefore, to provide a disk storage subsystem which includes a cache memory system which is relatively inexpensive, which minimizes the chance of corrupting data and which maintains the data integrity of the disk storage subsystem.

SUMMARY OF THE INVENTION

To increase the data integrity of disk storage subsystems, a cache memory can include both a volatile memory portion and a non-volatile memory portion. The volatile memory portion of the cache memory may be provided from volatile memory modules while the non-volatile memory portion may be provided from non-volatile memory modules.

Data transferred between the host computer and one or more disk drives of the disk storage subsystem is written to and read from the volatile cache memory modules. The non-volatile memory modules duplicate or mirror data stored in the volatile memory modules. Each non-volatile memory module can include a battery back-up power source which powers the non-volatile memory modules in the event of system power failure.

With this approach, the cost of the cache memory is minimized because rather than providing the entire cache memory as a non-volatile cache memory, the cache memory can include several non-volatile memory modules and a greater number of volatile memory modules. Moreover, the data integrity of the system is increased since in the event of a system power failure, for example, data stored in the non-volatile memory is preserved until the system power is restored. Upon power restoration the data may be retrieved from the non-volatile memory modules. Alternatively, if power cannot be restored, the non-volatile memory modules may be transferred to a different disk controller which has not lost power. This likewise increases the data integrity of the system since a user can restore the data preserved on the non-volatile memory module with relatively little difficulty.

The volatile cache memory is generally accessed by the disk subsystem controller microprocessor as a physically and logically contiguous memory. This is generally true even where the volatile cache memory may be provided from one or more physically separate volatile memory modules.

Each non-volatile memory module, on the other hand, is generally accessed as a physically and logically separate memory. This gives rise to certain problems in cache memory management of the volatile and non-volatile cache memory modules. Since the volatile and non-volatile memory modules are physically and logically separate, a technique is required to either update or invalidate data which is stored in both the volatile and non-volatile cache memory modules and thus prevent the corruption of data in the disk storage subsystem.

One approach to solving this problem is to provide separate cache memory management circuits for each of the logically and physically separate non-volatile memory modules. This approach, however, leads to a relatively expensive and complicated cache system since each of the separate cache memory management circuits must be coupled together and there activities must be coordinated to prevent data corruption.

It would thus be desirable to provide a relatively simple, low cost cache memory which includes a non-volatile memory module and a volatile memory module and which protects against data corruption in the cache memory.

It would also be desirable to provide a technique for managing a cache memory which includes at least one volatile memory module and a plurality of physically and logically separate non-volatile memory modules.

A disk controller is presently disclosed which includes a controller microprocessor coupled to a cache memory. The cache memory includes one or more volatile cache memory modules and one or more non-volatile cache memory modules which are physically and logically separate or disjoint from each other and from the volatile cache memory modules. A cache memory control circuit is coupled to each of the volatile and non-volatile cache memory modules. In response to a write command received from a host computer, the controller microprocessor allocates a predetermined number of memory blocks in the non-volatile cache memory modules. After allocating the memory blocks of the non-volatile cache memory, the disk controller selects and allocates a corresponding plurality of memory blocks in the volatile memory modules. Host supplied write-data is then stored in the allocated memory blocks of the non-volatile memory module. Immediately thereafter the subsystem sends an acknowledgment signal to the host that the write operation is complete. The cache memory control circuit then performs a direct memory access (DMA) operation to copy the write-data from the allocated memory blocks of the non-volatile memory module to the corresponding allocated memory blocks of the volatile memory module. The write-data is then stored on a disk drive at which point the allocated memory blocks of the non-volatile memory are de-allocated and thus made available for further use. Thus, by allocating memory blocks of the non-volatile memory only on an as-needed basis, the physically and logically disjoint volatile and non-volatile memories can be managed as if they were a single cache memory. Also by de-allocating the memory blocks of non-volatile memory module immediately after the data is written to disk, the data integrity of the disk controller can be improved with only a limited number of non-volatile memory modules rather than providing the entire cache as a non-volatile cache memory.

The memory blocks of the non-volatile memory modules form a so-called write-cache and the memory blocks of the volatile memory modules form a so-called read-cache. The write-cache and read-cache memory blocks are represented as domains in the controller microprocessor. Upon system initialization, the controller microprocessor establishes a free list which is a linked list of write-cache domains which are available for use. As write-cache memory blocks are allocated for use, the corresponding domains are removed from the top or head of the free list. After the data stored in the write-cache memory blocks are stored on the disk drive, corresponding domains which are made available for use are added to the bottom or tail of the free list of domains stored in the controller microprocessor thus indicating the memory blocks are available for use. In this manner, the memory blocks of the non-volatile memory modules which form the write-cache are efficiently managed and used.

The cache control circuit also allows a first non-volatile memory module (referred to as a primary mirror non-volatile memory module) to duplicate or mirror data stored on a second non-volatile memory module (referred to as a secondary mirror or more simply a mirror non-volatile memory module). Thus if either a controller microprocessor or a primary mirror non-volatile memory module fail, the mirror non-volatile memory module can be removed and placed into a different controller where data will be transferred from the mirror non-volatile memory module to disk. Using a first non-volatile memory module to duplicate data on a second non-volatile memory module reduces the potential for data loss. Thus, when the disk controller is operating in a mirror mode, cache data would not be lost unless both a primary non-volatile memory module and the corresponding mirror non-volatile memory module fail.

Moreover in this particular embodiment, the write-cache is interlocked with the read-cache and only one write-through is done in order from the write-cache to the read-cache. That is, all generations of data are written from the write-cache to the read-cache and the write operations are done in the same order as which they are received. Thus the last generation of data is the most up-to-date. Since only one write-through operation is performed, this eliminates the decision of which generation of write-data to disk is correct. With this technique coherency is maintained between the write-cache and the read-cache. Thus, the technique described herein is particularly useful for those systems which perform read-back operations immediately after a write-operation occurs.

Also disclosed is a method of managing a cache memory in response to a host initiated write-cache operation, which includes the steps of allocating from a list of available write-cache memory blocks a predetermined number of write-cache memory blocks, allocating a corresponding number of read-cache memory blocks, receiving write-data from the host, storing the write-data in the write-cache memory blocks and transferring the write-data from the write-cache to the read-cache. With this particular technique, a method of managing physically and logically disjointed memory modules in a cache memory is provided. The write-cache is provided from a plurality of physically and logically separate non-volatile memory modules. The read-cache is provided from a plurality of logically continuous and physically separate volatile memory modules. By first storing the write data received from the host in non-volatile memory modules and indicating to the host that the write operation is successfully completed and then transferring the write-data received from the host from the non-volatile memory modules to the volatile memory modules, the data is valid before the data is actually written to disk. Thus, any subsequent inquiry for that data in the cache memory results in a cache hit. As data is subsequently stored on the disk drives, the corresponding non-volatile memory blocks are made available for use. Thus, with this particular technique the memory blocks of the non-volatile memory module are rapidly made available for use in other write operations. This approach thus results in an efficient use of the memory blocks of the non-volatile memory module.

BRIEF DESCRIPTION OF THE DRAWINGS

The foregoing features of this invention as well as the invention itself may be more fully understood from the following detailed description of the drawings in which:

FIG. 4 is a diagrammatical view of an in-operation bit field;

FIG. 4A is a diagrammatical view of a valid bit field;

DESCRIPTION OF THE PREFERRED EMBODIMENTS

Figure 1:
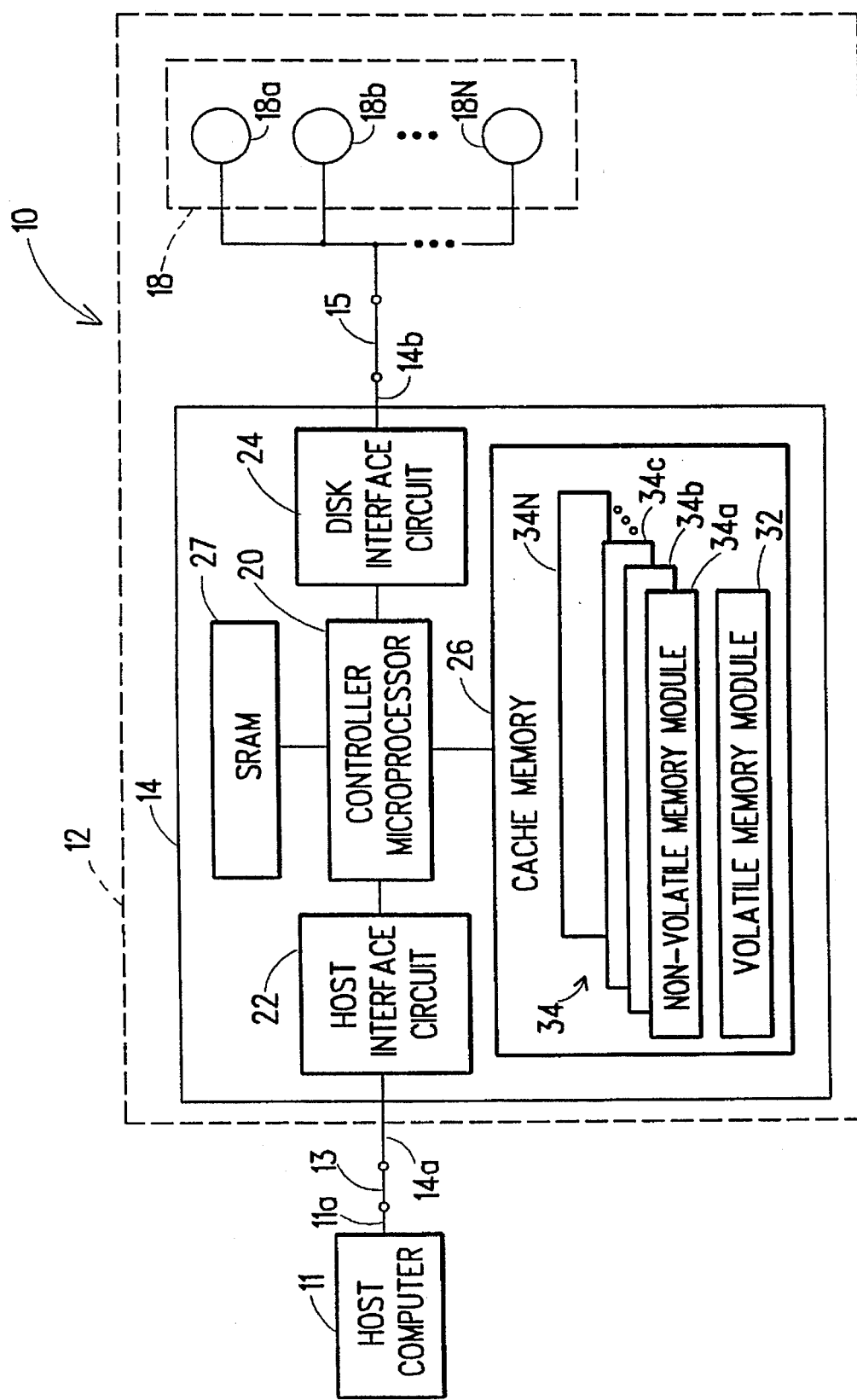
FIG. 1 is a block diagram of a disk storage sub-system including a cache memory having volatile and non-volatile memory modules.

Referring now to FIG. 1 a computer system 10 includes a host computer 11 coupled to a disk storage subsystem 12 through a host bus 13. The disk storage subsystem 12 includes a disk controller 14 coupled to one or more disk drives 18a–18N generally referred to as disks 18. The disk drives 18a–18N may be arranged as a redundant array of inexpensive disks (RAID).

In this particular embodiment, the host bus 13 is provided as a small computer system interface (SCSI) bus and thus host port 11a is of a type adapted to couple to a first end of the SCSI bus 13. Similarly, an input/output (I/O) port 14a of the disk controller 14 is adapted to couple to a second end of the SCSI bus 13. Disk controller 14 has a second I/O port 14b coupled through a disk bus 15 to the disk drives 18. The disk bus 15 may also be a SCSI bus.

Disk controller 14 also includes a controller microprocessor 20 which may be provided, for example, as the type manufactured by Motorola and identified as part number 68030. Those of ordinary skill in the art will recognize, of course that other microprocessors may be employed.

The controller microprocessor 20 is coupled to a host interface circuit 22 and a disk interface circuit 24. In this particular embodiment, each of the interface circuits 22, 24 include a small computer system interface (SCSI) circuit to couple, respectively, to the host and disk SCSI buses 13, 15.

The controller microprocessor 20 is also coupled to a cache memory 26. The controller microprocessor 20 transmits and receives control and command signals to and from the host computer and disk drives via the interface circuits 22, 24.

The data transfers between the host computer 11 and the disk storage subsystem 12 are controlled by the disk controller 14. All data which is the subject of a data transfer between the host computer 11 and the disk storage subsystem 12 is stored in the cache memory 26. For example, when host computer 11 initiates a write operation the data is first written to the cache memory 26 and then to the appropriate disk drives 18. Thus disk storage subsystem 12 is provided as a so-called write-through disk storage subsystem.

Similarly, when host computer 11 requests data, disk controller 14 first determines if the requested data is stored in the cache memory 26. If the data is not stored in the cache memory 26, then the data is retrieved from the appropriate one or ones of the disk drives 18, stored in cache memory 26 and then provided to the host computer 11. With this technique, the disk controller 14 maintains in the cache memory 26 a copy of the data transferred between host computer 11 and disk drives 18. Thus, when the host computer 11 requests information, if the information is stored in the cache memory 26 the information may be rapidly retrieved from the cache memory 26 thereby avoiding the necessity of accessing the disk drives 18 which are slower than the cache memory 26.

The controller microprocessor 20 places data into the cache memory 26 and, as will be described below in conjunction with FIG. 2, performs those steps necessary to indicate to the host computer 11 that the data is valid.

A dedicated high-speed, static random access memory (SRAM) 27 is coupled to the controller microprocessor 20. Stored in the SRAM 27 are cache management tables which are employed for cache management look-up and store operations to be described below.

In the present embodiment the cache memory 26 is provided from a plurality of memory modules. As shown in FIG. 1, the cache memory 26 includes one or more volatile memory modules 32 which may for example be provided as dynamic random access memory modules (DRAMs). Cache memory 26 also includes a plurality of non-volatile (NV) memory modules 34a–34N generally denoted 34. In one embodiment one or more of the memory modules 32, 34 may be provided as single in-line memory modules (SIMMs). The non-volatile memory modules 34 may be provided, for example, as the type described in co-pending patent application serial number 08/294,481 filed Aug. 23, 1994 assigned to the assignee of the present invention and incorporated herein by reference.

The volatile cache memory modules 32 can have data both read therefrom and written thereto while the non-volatile memory modules 34 can only have data written thereto. Hence the volatile cache memory modules 32 may collectively be referred to as a "read-cache" while the non-volatile memory modules 34 may collectively be referred to as a "write-cache" or a "buffer cache."

In response to a host initiated write request, write-data received from the host 11 is first stored in memory blocks of one or more of the non-volatile memory modules 34. Then as will be described in detail below in conjunction with FIG. 2 below, the write-data is copied from the memory blocks of the non-volatile memory modules 34 to corresponding memory blocks of the volatile memory modules 32. Thus, write-data stored in the volatile memory 32 is replicated or backed-up in non-volatile memory modules 34.

The write-data is then written to disk drive 18. When the data is written across all of the disk drives 18a–18N in a so-called striping technique, disk-storage sub-system 12 is operating as a RAID level zero (RAID-0) disk storage sub-system. Alternatively, if disk storage subsystem 12 stores parity information on one disk drive and stripes data across all of the disk drives, then disk-storage sub-system 12 is operating as a RAID-3 disk storage sub-system. If both data and parity information are striped across the disk drives then disk-storage sub-system 12 is operating as a RAID-5 disk storage sub-system.

Upon completion of the write-to-disk operation, the memory blocks of the non-volatile memory modules 34 are made available for back-up storage of data stored in different memory blocks of the volatile memory modules 32. Thus, non-volatile memory modules 34 have stored therein a copy of data stored in the volatile memory modules 32 until the data is copied from the volatile memory modules 32 to the disk drive 18.

Non-volatile memory modules 34 receive system power via disk controller 14 and also include a stand alone power source independent of sub-system controller 14. Thus, non-volatile memory modules 34 are able to retain host data even if power is not supplied thereto by sub-system controller 14.

Since memory modules 34 retain data therein even if power to disk controller 14 is lost or if disk controller 14 fails, memory modules 34 can be physically removed from the failed disk controller and re-installed in a replacement disk controller. Thus in the event of system power loss or failure of disk controller 14, memory modules 34 preserve the data integrity of the disk-storage sub-system 12. Furthermore, the ability to retain host data in memory modules 34 allows controller microprocessor 20 to acknowledge host write operations as complete before the write-data is actually stored on disk drive 18.

As mentioned above, the non-volatile memory modules 34 are both physically and logically separate from the volatile memory modules 32. This consequently gives rise to a cache memory management problem. Specifically, since the different memory modules 32, 34 need not necessarily be treated as a single memory, it is possible to have the same data stored on more than one of the memory modules 32, 34. Thus, different versions of the same data may be stored in the memory modules 32, 34 or in the disk drives 18.

Since different versions of the same data may be stored in the memory modules 32, 34 or in the disk drives 18, it is important to maintain data coherency between each of these memory locations. If the disk controller 14 fails to maintain data coherency between the memory locations, the data is said to be corrupt. Thus, to maintain the data integrity of the disk storage subsystem 12, the disk controller includes a cache memory management circuit which will be described below in conjunction with FIG. 2.

Stored in the SRAM 27 is a sequence counter. The sequence counter is maintained by control software executed by the controller microprocessor 20. The sequence counter will be explained further below in conjunction with FIGS. 3 and 3A. Suffice it here to say that the sequence counter tracks the number of write requests from the host to particular memory blocks of the read-cache. The sequence counter is used to maintain coherency between the data stored in the write-cache and the read-cache.

Figure 2:
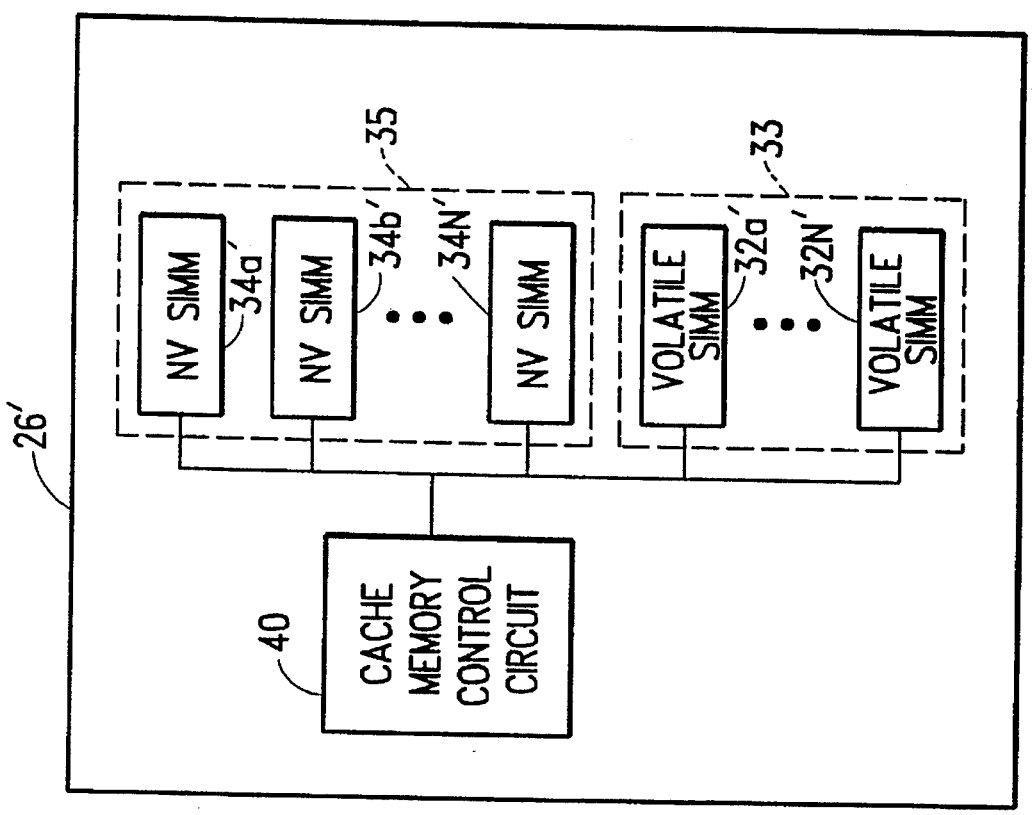
FIG. 2 is a block diagram of a cache memory subsystem.

Referring now to FIG. 2, the cache memory 26 is shown to include a plurality of volatile SIMMs 32a'–32N' which provide a read-cache 33 and a plurality of NVSIMMs 34a'–34N' which provide a write-cache 35. It should be noted that since, as discussed above, the NVSIMMs 34' are generally more complex and expensive than the volatile SIMMs 32' it is preferable to provide the cache 26 having a greater number of volatile SIMMs than NVSIMMs. Furthermore, in some applications it is preferable to provide the cache memory 26 having more read-cache than write-cache since the write-cache can be re-used to back up different memory blocks of the read-cache. Those of ordinary skill in the art will recognize of course that the particular number of volatile SIMMs and NVSIMMs which provide the cache memory 26 should be selected to maximize performance in the particular system in which the cache 26 is to be employed.

As described above in conjunction with FIG. 1, the write-cache 35 acts as a buffer in which data is stored prior to the time the data is copied to the disk drives 18 (FIG. 1). Once the data is copied into the read-cache 33 the data is considered valid and can be retrieved by the controller microprocessor 20 (FIG. 1) and provided to the host computer 11 (FIG. 1) for example.

As also mentioned above, the read-cache and write-cache 33, 35 are physically separate. The read-cache 33 is provided from several SIMMs which are logically contiguous but physically separate while the write-cache 35 is provided from a plurality of NVSIMMs which are both physically and logically separate. This gives rise to a problem in cache memory management since it possible to have old data stored in the read-cache 33 and modified data stored in the write-cache 35 or visa-versa.

To prevent the controller microprocessor from accessing stale or corrupt data, a cache memory control circuit 40 is coupled to both the volatile SIMMs 32' which form the read-cache 33 and the NVSIMMs 34' which form the write-cache 35. The cache memory control circuit 40 controls data transfers between the NVSIMMs and the volatile SIMMs. The cache memory control circuit 40 performs a DMA transfer to copy data from the NVSIMMs 34' to the volatile SIMMs 32'.

When memory blocks of the write-cache 35 in which data is stored should be copied to the read-cache 33, controller microprocessor 20 locks a corresponding number of memory blocks in the read-cache 33 and the cache memory control circuit 40 automatically performs a DMA transfer from designated memory blocks of the NVSIMM to the corresponding memory blocks of the volatile SIMM. The controller microprocessor 20 cannot access the read-cache memory blocks until the DMA transfer is complete. Upon completion of the DMA transfer, the read-cache memory blocks are considered valid and available and thus can be accessed by the controller microprocessor 20. In this manner, data integrity is maintained between the read-cache 33 and the write-cache 35.

Cache memory control circuit 40 may be provided as a cache memory control application specific integrated circuit (ASIC) which controls both the SIMMs 32' and the NVSIMMs 34'. It is understood that although cache memory control circuit 40 is here described as a single ASIC in some embodiments it may be desirable to provided control circuit 40 as two or more separate ASICs. For example a first ASIC could direct address control and a second different ASIC could direct data and error control. Suffice it to say that the cache memory control circuit 40 may perform a variety of control functions including but not limited to cache control and DMA control and that each of such functions may be performed by one or more ASICs. For example, a DMA ASIC could control DMA transfers between the NVSIMMs and the volatile SIMMs.

It should be noted that the cache memory control circuit 40 does not distinguish between the volatile SIMMs 32' and the NVSIMMs 34'. Rather, memory control circuit 40 controls the particular types of memory devices which are disposed on the respective SIMMs 32', 34' For example if the NVSIMMs 34' are provided from pseudo-static random access memory devices (PSRAMs), then control circuit 40 must be able to control the PSRAMs. Likewise if the volatile SIMMs 32' are provided from dynamic random access memory devices (DRAMs), then the control circuit 40 must be able to control the DRAMs.

It should also be noted that in some embodiments the cache memory control circuit 40 may operate in a so-called mirror mode. In the mirror mode one of the NVSIMMs, duplicates or mirrors the data stored on a different one of the NVSIMMs. For example NVSIMM 34a' could mirror the data stored on NVSIMM 346b'. Thus if controller microprocessor 20 (FIG. 1) or the primary non-volatile memory module 34b' fail, the mirror non-volatile memory module 34a' can be removed and placed into a different controller where data will be transferred from the mirror non-volatile memory module 34a' to disk.

This reduces the potential for data loss. Thus, when the disk controller is operating in a mirror mode, cache data would not be lost unless the data is lost in the non-volatile memory module and both the primary non-volatile memory module 34b' and the corresponding mirror non-volatile memory module 34a' fail.

Figure 3:
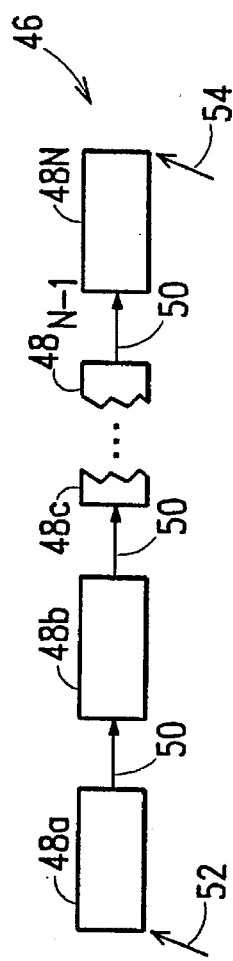
FIGS. 3–3B are diagrammatical representations of a sequence of linked domains.

Referring now to FIG. 3, upon system initialization, the controller microprocessor 20 (FIG. 1) establishes a so-called "write-cache free list" 46 which corresponds to a list of memory blocks available for use in the write-cache 35 (FIG. 2). The write-cache memory blocks are represented as domains 48a–48N. The domain size is selectable, however, in this embodiment, each domain 48a–48N represents eight write-cache memory blocks. Each domain in the free list 46 is connected or linked via pointers 50. That is, each domain 48a–48N has associated therewith a pointer which points to the first memory block in the next domain. The microprocessor 20 also establishes a head pointer 52 and a tail pointer 54 which respectively point to the beginning and end of the free list 46.

In this particular embodiment, the memory blocks of the read-cache are likewise represented as domains and the size of the read-cache domains are set equal to the size of the write-cache domains 48a–48N. Thus although the domain size of the read-cache is configurable, in this particular embodiment it is also set to eight. Thus, each read and write domain represents eight memory blocks of read and write-cache respectively.

There exists in the memory of the controller microprocessor 20 one sequence counter per domain. As mentioned above in conjunction with FIG. 1, the sequence counter tracks the number of write requests from the host to particular memory blocks of the read-cache.

The write-domain sequence counters must insure consistency between the read-cache and the write-cache. Each time the controller microprocessor 20 receives a write request for the write-cache memory, the write domain sequence counter value is incremented. Similarly, each time data is written to the disk drive 18 the sequence counter decrements. Thus if there are four write operations to be performed to disk, for example, then the sequence counter holds a value of four indicating that the data in the write-cache and read-cache has been updated but that the data has not yet been written to the disk drive 18.

When the write to disk operations occur, the sequence counter is decremented. When all four of the write operations are complete, the sequence counter reads zero. Thus indicating that all of the updated data had been transferred to disk.

The sequence counter prevents data stored in a read block (i.e. a memory block of the read-cache) from being removed (i.e. retired) from the cache memory 26 until the write-to-disk operation is complete. In this manner, the data stored on the disk drive 18 will be properly updated before the data is removed from the read-cache. If read-cache blocks are removed prior to the time all of the write-to-disk operations are complete (i.e. multiple writes to the same read block are still in transit to disk) then a cache miss could occur in the read-cache. Since the write-cache is not searched, the data would not be found in the write-cache. The data would then be immediately retrieved from the disk drives. Furthermore as will be described below, since read operations are given priority over write operations stale data would be retrieved from the disk drive. Therefore, to prevent incorrect data from being read from the disk drive due to the fact there is write-data in transit to the disk drive which has not yet been stored in the disk drive, data stored in a read-cache memory block can never be retired until the sequence counter holds a value of zero for that particular memory block thus indicating that the most recent data stored in the read-cache has been written to the disk drive 18.

Data stored in the read-cache which is not frequently accessed is eventually removed from the read-cache. For example, data may be removed from the read-cache through a least recently used algorithm (LRU). When data is removed from the read-cache, all of the data in the memory blocks which are represented by the same domain is also removed from the read-cache. That is, all of the data stored in the eight blocks of memory represented by a single domain is removed from the read-cache.

Referring briefly to FIGS. 4 and 4A, each domain 48a–48N has associated therewith a valid field 57 and an in-operation field 73. As mentioned above in conjunction with FIGS. 3–3B, in this embodiment, each domain represents eight memory blocks and thus the domain size is said to be set to eight. Thus, the in-operation field and valid field are each provided having eight bits. Valid field 57 therefore includes bits 58–72 and in-operation field 73 includes bits 74–88.

For each domain, each bit in the corresponding valid field 57 indicates whether or not data stored in a corresponding one of eight memory blocks is valid. Similarly, each bit in the in-operation field indicates whether or not data in a corresponding one of eight memory blocks is in-operation or locked. Thus, the status of each memory block in a domain can be ascertained by examining the bits of the valid and in-operation fields 57, 73 which represent the status of the memory blocks of interest.

If the in-operation field 73 indicates that no action is being taken with respect to particular memory blocks in a particular domain and the valid field 57 indicates that the particular memory blocks contain valid data, then a cache hit can occur in that memory block. If either of the valid fields 57, 73 indicate either that the block is locked, however, then a cache hit cannot occur in that memory block. Thus, before a read-cache memory block can be used, the bits of the in-operation and valid fields 57, 73 corresponding to that read-cache memory block must have predetermined values indicating that the memory block contains valid data and that the block is not in-operation (i.e. that the memory block is not locked).

Due to the manner in which the in-operation and valid fields 57, 73 operate, it is possible to manage each memory block within a domain individually. That is, it is possible to manage individual blocks of memory within a domain. This technique is generally referred to as partial domaining. If partial domaining is not used, however, then the entire domain must be operated on at the same time. For example, the eight memory blocks must be read or written at the same time.

As mentioned above, the domain size can be varied to represent either fewer or more than eight blocks of memory (e.g. 4 memory blocks, 8 memory blocks, 16 memory blocks, etc . . .). By using the domain approach the amount of memory required to manage the memory blocks of the read and write-cache can be minimized. Thus, although the read and write-cache could be managed on a single memory block basis (i.e. each domain represents a single memory block), this would result in the need for a very large memory in order to manage all of the single domain blocks.

It should be noted that the cache hit rate depends on a number of factors including, but not limited to, the domain size, the amount of read cache, the amount of write cache, the ratio of read operations to write operations and the look ahead size. With respect to the domain size, the domain size should be selected in accordance with the particular application. The domain size may thus vary from application to application.

For example, selecting a relatively small domain size with an application having a relatively large number of sequential write operations can increase the system overhead. However, selecting a relatively large domain size with an application having a relatively large number of sequential write operations can decrease the system overhead. Thus the particular domain size to be used in a system should be selected in accordance with the characteristics of the particular system in which the cache memory is used.

Figure 3A:
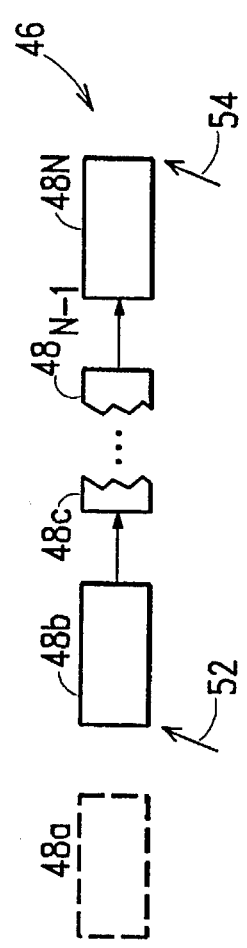
Figure 3B:
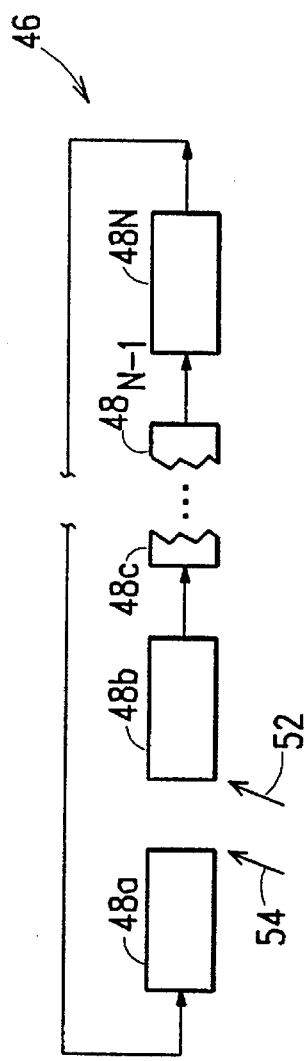

Referring to FIGS. 3A and 3B, when a write command is received by the disk controller, the disk controller first allocates memory blocks in the write-cache and makes certain that the blocks are not in use via the in-operation and valid fields 57, 73 (FIG. 4).

When a write-cache memory block is allocated it is removed from the head of the free list. For example assuming the eight memory blocks represented by domain 48a are allocated, then the domain 48a is effectively removed from the free list by modifying the head pointer 52 to point to a new head of the free list. Thus domain 48a is no longer part of the free list 46. Rather domain 48a is not considered to be available and cannot therefore be allocated from the free list 46.

Once the write-through operation is complete and the data stored in the write-cache memory blocks represented by domain 48a is written to the disk drive 18 (FIG. 1), then as shown in FIG. 3B domain 48a is appended to the tail of the free list 46 by modifying the tail pointer 54 to point to a new tail of the free list 46. Thus write-cache domains 48 are allocated from the head of the free list 46 and are returned to the tail of the free list 46 when they are again available for use.

Figure 5:
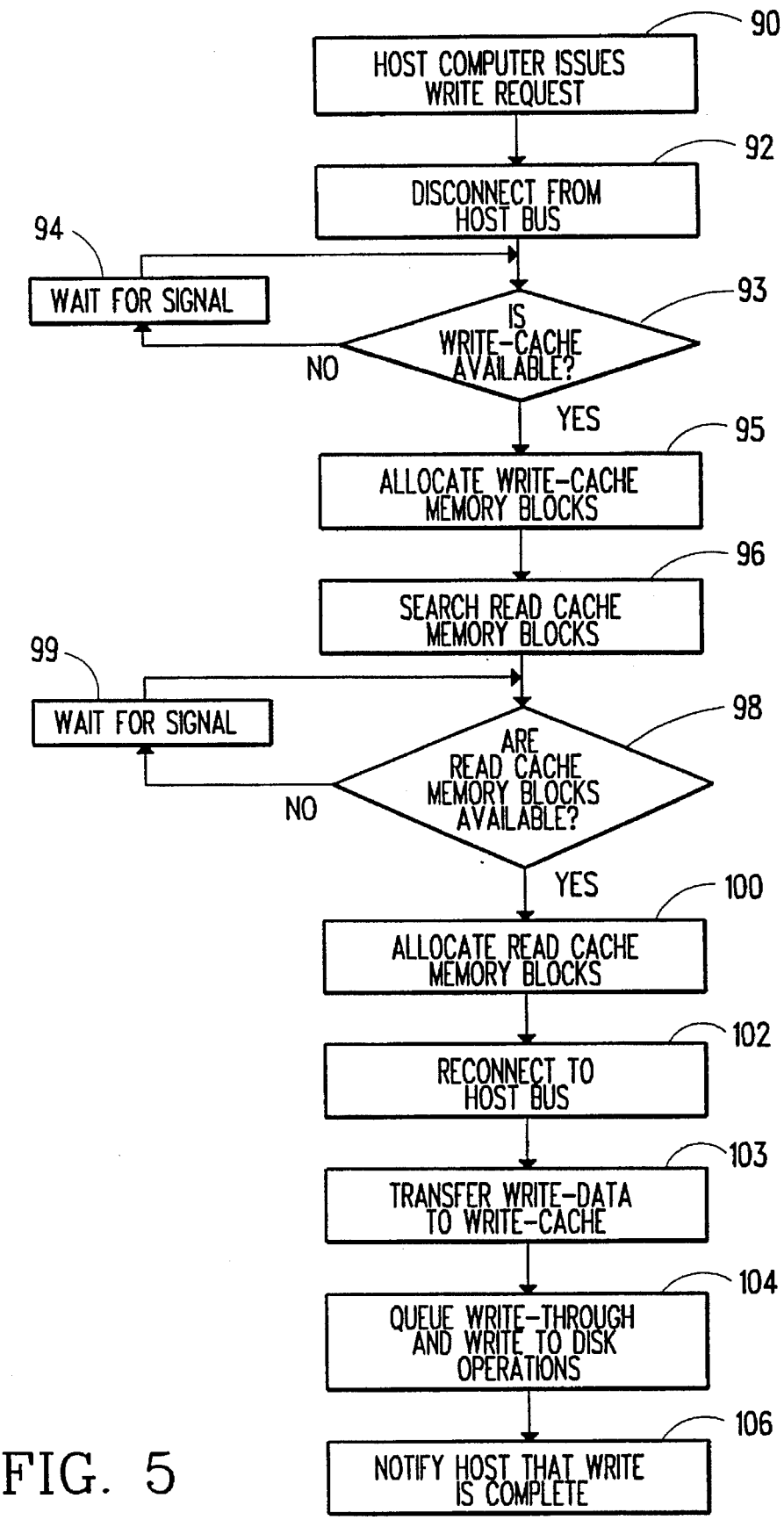
FIG. 5 is a flow diagram showing the steps performed in processing a write to disk operation issued by a host computer.

FIG. 5 shows a flow diagram of the method employed in disk controller 14 to transfer data between the host computer 11 and the disks 18 within the disk storage subsystem 14. In the flow diagram, the rectangular elements (typified by element 90 herein denoted "processing blocks" represent steps or instructions or groups of instructions. The diamond shaped elements (typified by element 93) herein denoted "decision blocks" represent steps or instructions or groups of instructions which affect the execution of the steps represented by the processing blocks.

FIG. 5 shows those steps which take place in response to the host 11 (FIG. 1) issuing a write to disk operation. Turning now to FIG. 5, as shown in step 90, the host issues a write request which is received by the disk controller 14.

Although in the embodiment described herein the cache is coupled to the host and the disk drives via SCSI buses and thus operates in accordance with a SCSI protocol, those of ordinary skill in the art will recognize that the cache could operate in any environment. For example, the cache could be coupled to a serial SCSI adapter (SSA), a fibre-channel adapter or any other type of adapter and operate in accordance with the protocol of that particular adapter. The disk storage subsystem should receive some type of descriptor block from the host that describes the logical drive and the logical address of where the data is to be written.

When the host includes a SCSI interface, the host write-request is transmitted along with a command descriptor block (CDB) which includes a target ID (TID) and a logical unit number (LUN) which indicate the address of the memory block and the particular disk drives which the controller should access. The CDB also includes a block count which represents the number of blocks to be written.

The disk controller then disconnects the from the host bus as shown in step 92. This allows other operations to be performed with the controller. For example if the disk controller is provided as a so-called multi-threaded disk controller then the disk controller can initiate a plurality of operations in response to different commands provided thereto.

Decision block 93 and processing block 94 implement a loop in which the controller microprocessor 20 determines whether a sufficient number of write-cache memory blocks are available for use. As shown in step 93 the controller microprocessor 20 determines whether a sufficient number of write-cache memory blocks are available for use. If there are an insufficient number of write-cache memory blocks available then a condition generally referred to as write-cache saturation has occurred. This means that most memory blocks in the write-cache are currently being used and controller microprocessor 20 must wait for write-cache memory blocks to become available for use. Thus, processing continues to processing block 94 where the controller microprocessor waits to receive a signal which indicates that write-cache memory is available.

As mentioned above, write-cache memory blocks become available after the a write-through operation is complete and the data stored in the memory blocks is written to disk. Thus the disk controller 12 waits until a sufficient number of write-cache memory blocks are available before proceeding to the processing step 95. Once a sufficient number of write cache memory blocks are available for use, then as shown in processing block 95 the write-cache memory blocks are allocated from a free list.

When the disk controller allocates write-cache memory blocks, those particular memory blocks within the write-cache are unconditionally allocated. Corresponding blocks in the read-cache, however, may be in use and thus it may be necessary to wait for the read-cache to be available before the allocation is complete. Thus, as shown in step 96 the read-cache is searched for the available memory blocks. That is, when a write-operation is being performed if it is known that write-cache blocks are available, then they are unconditionally allocated. However, the read-cache must be searched to determine whether or not that read-block (i.e. the data in that read block) is already stored in the read-cache. If the data is already in the read-cache a cache hit has occurred.

If the memory block is in the read-cache then the corresponding read-cache domain is already allocated. Thus, the write-data can be immediately transferred (e.g. via DMA operations) from the host to the write-cache and then subsequently to the read-cache. If the memory block is not already in the read-cache then the read-cache domain corresponding to the already allocated write-cache domain must be allocated to thus have corresponding memory blocks available in the read-cache and the write-cache. The write-data can then be transferred from the host to the write-cache and then subsequently to the read-cache. Thus the read-cache must be searched to determine if the memory block is already in the read cache before the write-data can be transferred to the write-cache and the read-cache.

Decision block 98 and processing block 99 implement a loop in which the controller microprocessor 20 determines whether a sufficient number of read-cache memory blocks are available for use. As shown in decision block 98, decision is made as to whether the corresponding memory blocks are available in the read-cache. The decision in step 98 is made based upon bit values of the appropriate in-operation and valid bit-fields of the read-cache. That is, read-cache in-operation and valid bit fields indicate whether a particular memory block in the read-cache is in-operation or holds valid data.

If the read-cache memory blocks are not available then processing continues to processing block 99 where the controller microprocessor waits to receive a signal which indicates that read-cache memory is available. Once the read-cache memory blocks are available, the controller allocates the read-cache memory blocks as shown in step 100.

Once the read-cache memory blocks are allocated, then as shown in step 102 the connection to the host bus is re-established and as shown in step 103 the write-data is stored in the allocated memory blocks of the write-cache. At this point the corresponding valid and in-operation fields of the write-cache indicate that the data is valid and locked (i.e. an operation is occurring).

As shown in step 104, a write-through operation is begun in which the data in the write-cache is copied to the read-cache. This copy is performed as a DMA transfer by the cache memory control circuit 40 (FIG. 2) which may be provided, for example, as an enhanced RAID integrated circuit application specification integrated circuit (ASIC).

Prior to completion of the write-through operation, the corresponding bits of the valid field and the in-operation field of the read-cache memory block have not yet been set. Thus, the data block cannot be accessed or modified. Upon completion of the write-through operation, the appropriate bits of the valid and in-operation fields of the read-cache memory block are set. At this point the data is considered valid and is available to the host. Thus, until the write-through operation is complete the data cannot be accessed by the host.

It should be noted, however, that the data is indicated as valid prior to the time the data is actually written to disk drive 18. It should also be noted that there can exist a short time interval between the time when the write block is valid and unlocked and the time when the read block is valid and unlocked.

As indicated in step 104, the write-through and write to disk operations are concurrently queued. Since the cache memory control circuit 40 (FIG. 2) performs a DMA transfer between the write-cache and the read-cache the write-through operation is nearly instantaneous while the write-to-disk operation may be completed at a later point in time.

Upon completion of both the write-to-disk and write-through operations, the write-cache memory blocks which held the data which was the subject of the write operation are then made available for use by appending to the tail of the free list the addresses corresponding to the available memory block as described above in conjunction with FIG. 3.

It is recognized that in some instances, the host may issue multiple write commands to the same memory block. In order to reduce write traffic to the disk drives, since data transfers to the disk drives are performed on a first-in-first out (FIFO) order, if there exist a large number of writes directed to the same memory region of the disk drive, then only the data which was the subject of the last write-data operation need be transferred to the disk drive. That is, older generations of data directed to the same memory region can be eliminated and only the most recent and up-to-date generation of data need be written to the disk drives. This technique is generally referred to as write-merging or write-over and can be used to reduce write traffic to the disk drive.

In the write-merging technique, the addresses of the locations where write data is to be written are stored in the write-cache. The controller microprocessor compares pointers to the addresses to pointers of the addresses of locations where subsequent write operations are to be performed. The controller microprocessor compares, via the pointers, the read-cache addresses and the disk addresses to determine if two addresses are the same. If two addresses match then the oldest data for that address is removed from the write-cache and the most recent or up-to-date data is written to disk.

In an alternate embodiment, in order to reduce write traffic to the disk drives, the sequence counter for a particular domain may be examined to determine if multiple writes to the same domain occurred.

It should also be noted that if there are a large number of blocks being written to the disk drive, then a read operation can be interleaved with the write-to-disk task to thus reduce waiting time for the read operation. For example, assuming a large number of write commands are issued by the host processor and received by the disk controller. The write-cache receives the multiple write-data and a DMA transfer is performed between the write-cache and the read-cache and the disk controller begins writing the data to the disk drives.

Assume, however, that prior to the time all of the write-to-disk operations are complete, the host processor issues multiple read requests which are received by the disk controller. It is desirable to process the read requests as rapidly as possible since the host processor may be waiting to receive the data before the host will process any other information.

The read requests may be rapidly processed in the following manner. The disk controller sends only one write-operation to the disk drive at a time and waits to receive an acknowledgement signal before sending the next write operation to the disk drive. Thus if read operations are waiting to be performed, once the disk acknowledges that a write operation is complete rather than performing another write operation, the disk controller immediately performs all of the waiting read operations.

That is, the write operations are controlled or gated by the acknowledgment signal while the read operations take place without waiting for an acknowledgement signal between each read operation. Thus, the read operations can be completed prior to the time the write-data is written to disk thereby improving system performance.

After the read operations are complete the remaining write-to-disk operations are then performed. If no read operations were waiting to be processed then after each acknowledgement signal is received, the next write-to-disk operations would be performed.

As mentioned above, by providing the write-cache as a nonvolatile write-cache and storing the data first in the non-volatile write-cache and subsequently in the read-cache, the write-data may be acknowledged as valid even though the data has not yet been written to the disk drives. Since the write operations have already been acknowledged as complete and the data valid even through the data has not yet been written to disk, the host considers the write operation to be complete and a cache hit can occur on data not yet written to disk.

As shown in step 106 once the write to disk operation is complete the host is notified.

Figure 6:
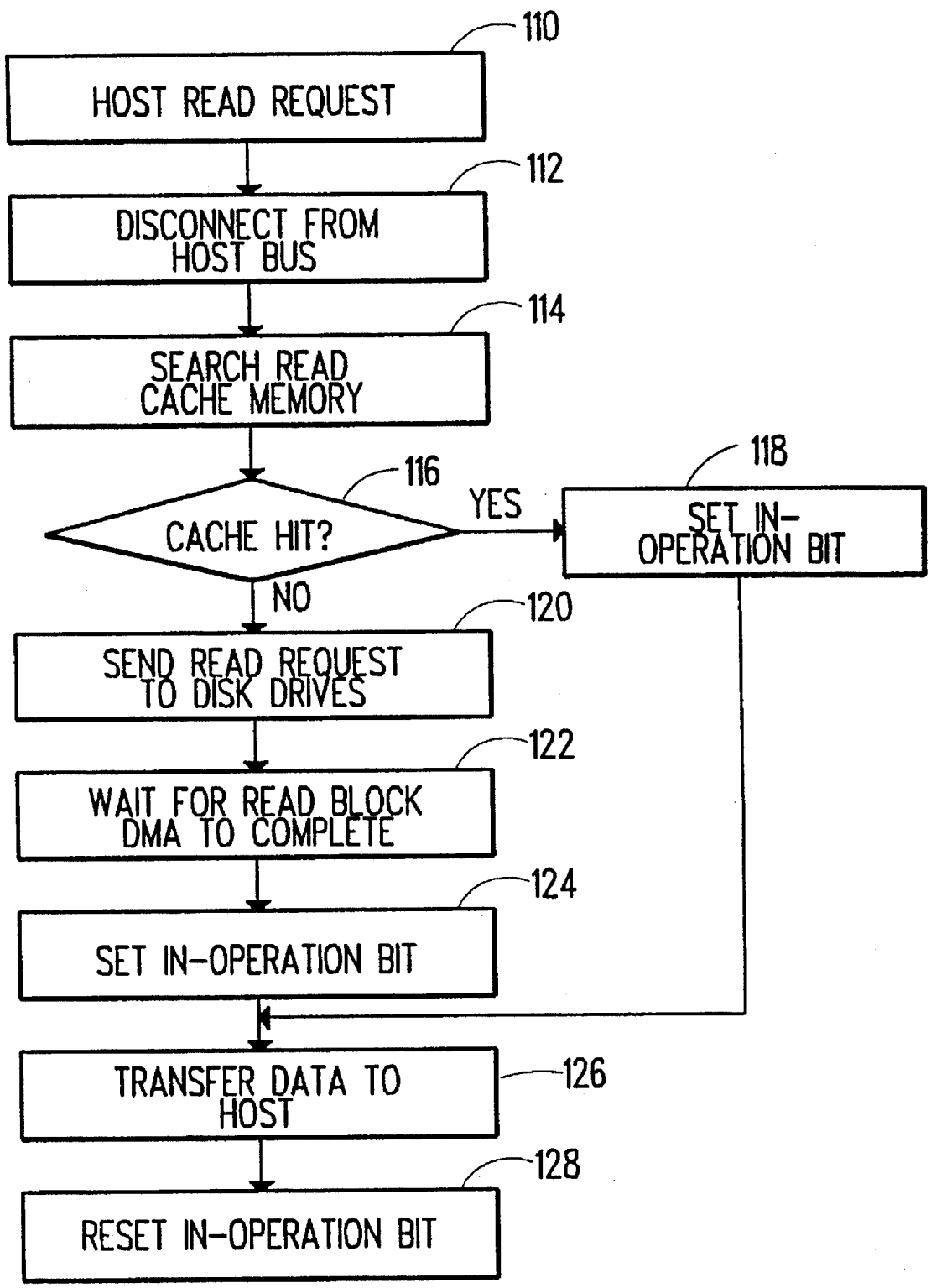
FIG. 6 is a flow diagram showing the steps performed in processing a read operation issued by a host computer.

FIG. 6 shows a flow diagram of the method employed in the disk controller 14 (FIG. 1) to transfer data between the disk drive 18 (FIG. 1) and the disk controller 14 in response to a host initiated read operation. As shown in step 110, the host issues a read request including a CDB which includes the TID and LUN information. Next, the controller microprocessor 20 (FIG. 1) disconnects the disk controller 14 from the host bus as shown in step 112.

In step 114 the read-cache is searched for the data which is the subject of the read request. In step 116 if the desired data is found, then a cache hit has occurred and as shown in steps 118, 126 and 128 the in-operation bit is set, data is transferred from the read-cache to the host and the in-operation bit is then reset.

If a cache hit does not occur, then the read request is sent to the disk drives 18 as shown in step 120. As shown in step 122 the system waits for a DMA transfer between the disk drives and the disk controller 14 to complete. At this point the data is stored in the cache memory of the disk controller. The appropriate bit of the in-operation bit field is then set as shown in step 124. The data is then transferred to the host and the in-operation bit is then reset as shown in steps 126 and 128.

It should be noted that if a cache miss occurs and a large number of blocks are to be transferred from the disk drive to the host then it is possible to minimize the latency between the host and disk drives by sequentially transferring the data from the disk drives to the host four blocks at a time for example. This results in a pipeline type of operation in transferring data from the disk drive to the host.

Having described preferred embodiments of the invention, it will now become apparent to one of skill in the art that other embodiments incorporating the presently disclosed concepts may be used. Accordingly the present invention should be viewed as limited only by the spirit and scope of the appended claims.

What is claimed is:

1. A disk controller coupled between a host computer and a disk drive, the disk controller comprising:
   a controller microprocessor;
   a cache memory including:
      at least one volatile memory module; and
      at least one non-volatile memory module;
      a cache memory control circuit coupled to said at least one non-volatile memory module and said at least one volatile memory module wherein in response to a write command received from the host computer, said controller microprocessor allocates a predetermined number of memory blocks in each of said at least one volatile and said at least one non-volatile memory modules for storage of write-data and upon completion of a write operation to said at least one non-volatile memory modules, said cache memory control circuit transfers the write-data from said at least one non-volatile memory module to said at least one volatile memory module.

2. The disk controller of claim 1 wherein:
   said controller microprocessor includes a memory having stored therein a list of memory blocks available for use in said at least one non-volatile memory module and wherein said controller microprocessor is adapted to allocate from the list a predetermined number of memory blocks of said at least one non-volatile memory module for storage of the host write-data thereby removing the predetermined number of memory blocks of said at least one non-volatile memory module from the list of memory blocks available for use; and
   said controller is adapted to allocate a corresponding number of memory blocks of said at least one volatile memory module such that said cache memory control circuit can transfer the write-data from the predetermined memory blocks of said at least one non-volatile memory module to the corresponding memory blocks of said at least one volatile memory module.

3. The disk controller of claim 2 wherein said cache memory control circuit transfers the write data from said at least one non-volatile memory module to said at least one volatile memory module with a DMA transfer.

4. The disk controller of claim 3 wherein the list of available memory blocks is provided from a plurality of linked domains wherein each of said plurality of linked domains represents a predetermined number of memory blocks and wherein each of said plurality of domains has associated therewith a valid field and an in-operation field which indicate the status of each memory block in said domain.

5. The disk controller of claim 3 wherein in response to write-data being stored on the disk drive, the allocated memory blocks of said at least one non-volatile memory module are de-allocated and added to the list of memory blocks available for use.

6. The disk controller of claim 5 further comprising a sequence counter for tracking the number or write operations in particular one of said plurality of domains.

7. The disk controller of claim 3 wherein said cache memory control circuit is provided as an application specific integrated circuit.

8. The disk controller of claim 7 wherein:

said controller microprocessor includes a memory having stored therein a list of memory blocks available for use in said at least one non-volatile memory module wherein the list of available memory blocks is provided from a plurality of linked domains wherein each of said plurality of linked domains represents a predetermined number of memory blocks and wherein each of said plurality of domains has associated therewith a valid field and an in-operation field which indicate the status of each memory block in said domain;

said at least one volatile memory module is provided as a single in-line memory module; and said at least one non-volatile memory module is provided as a single in-line memory module.

9. A disk storage subsystem comprising:

at least one disk drive; and a disk controller coupled to said disk drive and adapted to couple to a host computer, said disk controller comprising:

a controller microprocessor;

a cache memory including:

a plurality of volatile memory modules which form a read-cache;

a plurality of non-volatile memory modules which form a write-cache; and a cache memory control circuit coupled to said non-volatile memory module and said volatile memory module wherein in response a write command received from the host computer, said controller microprocessor allocates a predetermined number of memory blocks in each of said volatile and said non-volatile memory modules for storage of write data and upon completion of a write operation to said non-volatile memory modules, said cache memory control circuit transfers the write data from said non-volatile memory module to said volatile memory module.

10. The disk storage subsystem of claim 9 wherein:

said plurality of volatile memory modules which form said read-cache are provided from a plurality of physically separate memory modules; and said plurality of non-volatile memory modules which form said write-cache are provided from a plurality of physically separate memory modules.

11. The disk storage subsystem of claim 10 wherein at least one of said plurality of non-volatile memory modules is provided as a single in-line memory module.

12. The disk storage subsystem of claim 11 wherein said controller microprocessor includes a memory having stored therein a list of memory blocks available for use in said non-volatile memory module wherein the list of available memory blocks is provided from a plurality of linked domains wherein each of said plurality of linked domains represents a predetermined number of memory blocks and wherein each of said plurality of domains has associated therewith a valid field and an in-operation field which indicate the status of each memory block in said domain.

13. The disk storage subsystem of claim 11 wherein:

said controller microprocessor includes a memory having stored therein a list of memory blocks available for use in said non-volatile memory module and wherein said controller microprocessor is adapted to allocate from the list a predetermined number of memory blocks of said non-volatile memory module for storage of the host write-data thereby removing the predetermined number of memory blocks of said non-volatile memory module from the list of memory blocks available for use; and said controller is adapted to allocate a corresponding number of memory blocks of said volatile memory module such that said cache memory control circuit can transfer the write-data from the predetermined memory blocks of said non-volatile memory module to the corresponding memory blocks of the volatile memory module.

14. The disk storage subsystem of claim 12 wherein in response to write-data being stored on the disk drive, the allocated memory blocks of said non-volatile memory module are de-allocated and added to the list of memory blocks available for use.

15. The disk storage subsystem of claim 14 wherein said at least one disk drive is a first one of a plurality of disk drives each of said plurality of disk drives coupled to provide a redundant array of inexpensive disks.

16. A method of transferring data to be written from a host computer to at least one disk drive within a disk storage subsystem including a host interface circuit, a disk interface circuit, a controller microprocessor, a cache memory, a cache memory management circuit and the at least one disk drive, the method comprising the steps of:

receiving in the disk storage subsystem a host write-to-disk command;

allocating a predetermined number of memory blocks in a non-volatile memory module of the cache memory;

allocating a predetermined number of memory blocks in a volatile memory module of the cache memory;

storing the data to be written to the at least one disk drive in the allocated memory blocks of the non-volatile memory module of the cache memory; and initiating a DMA transfer by the cache memory management circuit, to copy the data to be written to the at least one disk drive from the allocated memory blocks of the non-volatile memory module to the allocated memory blocks of the volatile memory module of the cache memory.

17. The method of claim 16 further comprising the step of transferring the data to be written from the allocated memory blocks of the volatile memory module of the cache memory to the at least one disk drive.

18. The method of claim 16 wherein the step of transferring the data to be written from the allocated memory blocks of the volatile memory module to the at least one disk drive includes the step of writing data across each of a plurality of disk drives coupled to provide a redundant array of inexpensive disks.

19. The method of claim 18 further comprising the step of writing parity information across each of the plurality of disk drives.

20. The method of claim 17 wherein after the step of transferring the data to be written from the allocated memory blocks of the volatile memory module to the at least one disk drive performing the step of de-allocating the predetermined number of memory blocks in the non-volatile memory module of the cache memory.

21. A method of controlling a cache memory of a disk storage subsystem coupled to a host computer, the method comprising the steps of:

establishing a list of available memory blocks in a write-cache;

in response to a write operation initiated by a host computer, allocating from the list of available memory blocks a predetermined number of memory blocks of the write-cache;

allocating a like predetermined number of blocks in a read-cache;

receiving write-data from the host computer;

storing the write-data in the allocated memory blocks of the write-cache;

indicating to the host computer that the write-data stored in the read-cache is valid and available for use; and transferring the write-data from the allocated memory blocks of the write-cache to the allocated memory blocks of the read-cache.

22. The method of claim 21 further comprising the step of storing the write-data on a disk drive of the disk storage subsystem.

23. The method of claim 22 further comprising the step of de-allocating the allocated memory blocks of the write-cache.

* * * * *